(12) United States Patent
Chen

(10) Patent No.: US 6,888,340 B1
(45) Date of Patent: May 3, 2005

(54) SEMICONDUCTOR DEVICE WITH A NEGATIVE VOLTAGE REGULATOR

(75) Inventor: Yin-Chang Chen, Hsin-Chu Hsien (TW)

(73) Assignee: AMIC Technology Corporation, Hsin-Chu (TW)

( * ) Notice: Subject to any disclaimer, the term of this patent is extended or adjusted under 35 U.S.C. 154(b) by 0 days.

(21) Appl. No.: 10/709,524

(22) Filed: May 12, 2004

(30) Foreign Application Priority Data

Mar. 4, 2004 (TW) ........................................ 93105761 A

(51) Int. Cl.[7] .............................................. G05F 3/16
(52) U.S. Cl. .................. 323/316; 323/313; 365/185.23; 365/185.33
(58) Field of Search .............................. 323/313–316; 363/59, 60; 327/536, 537, 542; 365/185.23, 185.33, 226

(56) References Cited

U.S. PATENT DOCUMENTS 6,600,692 B2 * 7/2003 Tanzawa ..................... 365/226

* cited by examiner

Primary Examiner—Gary L. Laxton
(74) Attorney, Agent, or Firm—Winston Hsu

(57) ABSTRACT

A semiconductor device includes a negative voltage regulator capable of regulating a negative input voltage and outputting a negative output voltage at an output node. The negative voltage regulator has a driver for adjusting the negative output voltage, a first operational amplifier for outputting a driving voltage for controlling a current on a first transistor included in the driver according to a feedback voltage and a reference voltage, a second operational amplifier for outputting a driving voltage for controlling a current of a second transistor, a current source circuit having two triple-well NMOS transistors for providing the driver a current, and a voltage potential divider for generating the feedback voltage by dividing potentials of a voltage source and the negative output voltage and outputting the feedback voltage to the first operational amplifier and the second operational amplifier for adjusting the currents of the first and second transistors thereby regulating the negative output voltage.

12 Claims, 3 Drawing Sheets

US 6,888,340 B1

SEMICONDUCTOR DEVICE WITH A NEGATIVE VOLTAGE REGULATOR

BACKGROUND OF INVENTION

1. Field of the Invention

The present invention relates to a semiconductor device with a negative voltage regulator, and more particularly, to a semiconductor device with a negative voltage regulator utilizing triple-well NMOS transistors.

2. Description of the Prior Art

There are a lot of applications that utilize regulators for tasks of regulating voltages. Many designs and patents of regulators have been developed for improving the performance of regulator circuits. One of the examples is U.S. Pat. No. 6,600,692, Semiconductor Device with a Voltage Regulator" to Tanzawa, which is included herein by reference.

Many applications require circuits that can boost up an input power supply DC voltage to a higher DC voltage used for specialized operations. The reason for the voltage boost up is that often only standardized power supply voltages are available for supplying power to electronic circuits. However, sometimes there are situations where a circuit needs a higher voltage than one available from the associated power supply. In addition, other circuits even require a negative voltage though only positive voltages from a power supply are available. One example of such a circuit is an electrical erasable programmable read only memory (EEPROM), typically termed in the art as "flash memory". A flash memory may require a negative voltage to perform erase operations. However, there are few achievements in regulating negative voltages. Techniques for regulating positive voltages, such as illustrated in U.S. Pat. No. 6,600,692 are not applicable to regulating negative voltages. In general, a negative pump is often utilized to generate a negative voltage. Please refer to FIG. 1. FIG. 1 is a block diagram of a prior art negative voltage generator 100. The negative voltage generator 100 includes an oscillator 110 and a negative pump 120. The oscillator 110 outputs its output to the negative pump 120, and then a negative voltage $V_{OUT1}$ is output from the negative pump 120. Please refer to FIG. 2. FIG. 2 is a block diagram of a prior art negative voltage regulator 200. The negative voltage generating circuit part includes an oscillator 210 and a negative pump 220 the same as the circuit in FIG. 1. The negative voltage regulating circuit part includes an AND gate 230, a voltage potential divider 240 and a comparator 250. $V_{ref21}$ and $V_{ref22}$ are two reference voltages. R21 and R22 are two voltage dividing resistors. Compared to the unregulated voltage $V_{OUT1}$ in FIG. 1, the voltage potential divider 240 divides the output voltage of the negative pump 220, $V_{OUT2}$ and the reference voltage $V_{ref21}$, and then inputs the voltage $V_{FEBK2}$ generated in the voltage division into the comparator 250 to be compared with the reference voltage $V_{ref22}$. The output of the comparator 250 and the output of the oscillator 210 are input to the AND gate 230, and the output of the AND gate 230 is then input to the negative pump 220. Thereby a regulation loop is formed, and the voltage $V_{OUT2}$ is a regulated negative output voltage.

For circuits that require high precision, the conventional negative voltage regulator 200 illustrated in FIG. 2 is not ideal. The operation of the conventional negative voltage regulator 200 illustrated in FIG. 2 is described as below. When the potential of the voltage $V_{OUT2}$ is lower than a predetermined potential, the feedback voltage $V_{FEBK}$ will be pulled down and the output of the comparator 250 is made digital 0 (low potential). The output of the AND gate 230 is made digital 0, hence the negative pump 220 stops charging along with the oscillator 210 and pulls up the potential of the voltage $V_{OUT2}$. Contrarily, when the potential of the voltage $V_{OUT2}$ is higher than the predetermined potential, the feedback voltage $V_{FEBK}$ will be pulled up and the output of the comparator 250 is made digital 1 (high potential). Therefore the negative pump 220 charges along with the oscillator 210 and then decreases the potential of the voltage $V_{OUT2}$. The regulation as described above is limited by the comparison range of the comparator 250 and the AND gate 230, and is similar to digital feedback regulation. The potential of the regulated voltage $V_{OUT2}$ still suffers significant ripple. In addition, the performance of the conventional negative voltage regulator 200 does not sufficiently meet the requirements of circuits that need to utilize negative voltages.

SUMMARY OF INVENTION

It is therefore a primary objective of the claimed invention to provide a semiconductor device with a negative voltage regulator.

Briefly described the claimed invention discloses a semiconductor device with a negative voltage regulator. The semiconductor device includes a negative voltage regulator capable of regulating a negative input voltage and outputting a negative output voltage at a first output node. The negative voltage regulator comprises a driver for adjusting the negative output voltage, a first operational amplifier capable of outputting a driving voltage for controlling a current of a first transistor included in the driver according to a feedback voltage and a first reference voltage, a second operational amplifier capable of outputting a driving voltage for controlling a current of a second transistor included in the driver according to a second reference voltage and the feedback voltage, a current source circuit comprising two triple-well NMOS transistors and capable of providing the driver a current, and a voltage potential divider capable of generating the feedback voltage by dividing potentials of a second voltage source and the negative output voltage and outputting the feedback voltage to the first operational amplifier and the second operational amplifier for adjusting the current on the first transistor and the current on the second transistor and thereby regulating the negative output voltage.

It is an advantage of the present invention that utilization of triple-well NMOS transistors enables the biasing at a negative voltage and hence achieves negative voltage regulation. The problem of excessive ripples of the negative output voltage in the conventional negative regulator is reduced and the requirements of circuits that utilize negative voltages are met.

These and other objectives of the present invention will no doubt become obvious to those of ordinary skill in the art after reading the following detailed description of the preferred embodiments that are illustrated in the various figures and drawings.

DETAILED DESCRIPTION

Figure 1:
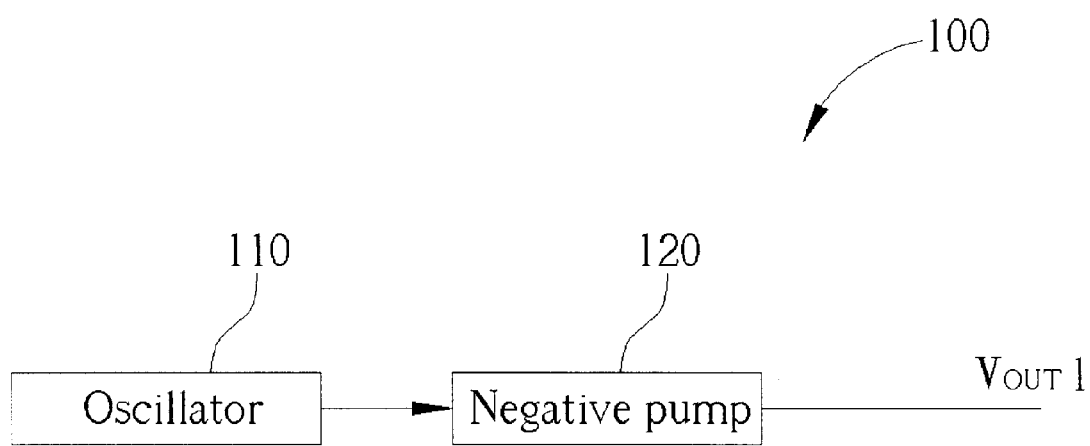
FIG. 1 is a block diagram of a prior art negative voltage generator.
Figure 2:
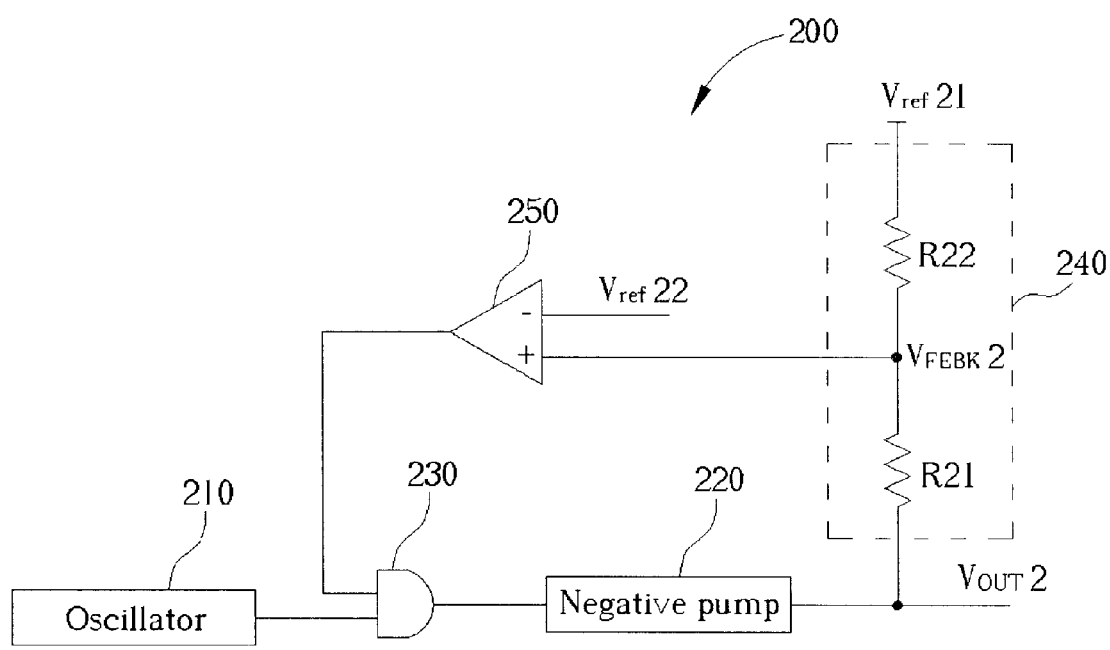
FIG. 2 is a block diagram of a prior art negative voltage regulator.
Figure 3:
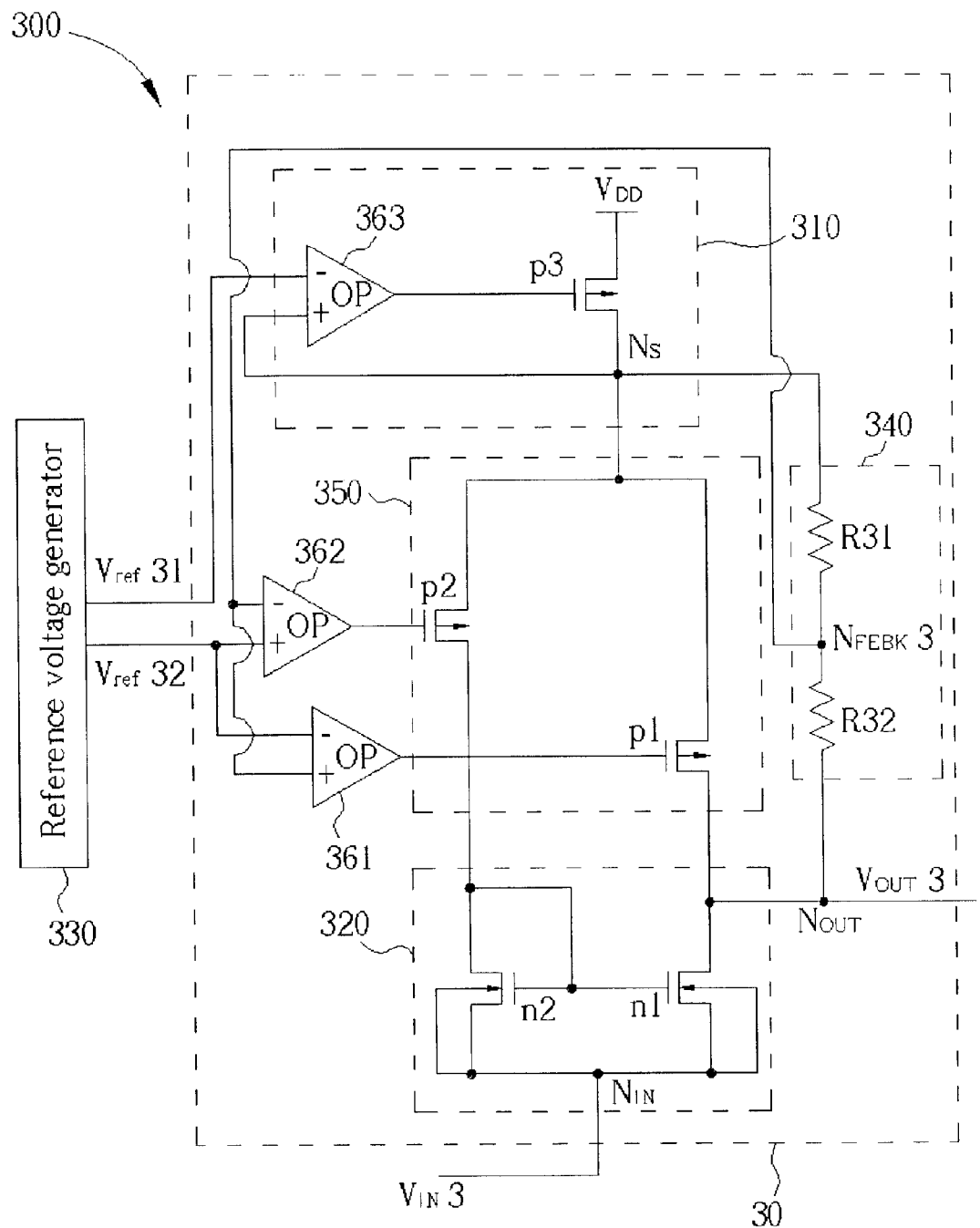
FIG. 3 is a block diagram of the present invention semiconductor device with a negative voltage regulator.

Please refer to FIG. 3. FIG. 3 is a block diagram of the present invention semiconductor device 300 with a negative voltage regulator 30. The negative voltage regulator 30 includes a voltage source regulator 310, a current source circuit 320, a voltage potential divider 340, a driver 350 and two operational amplifiers 361 and 362. An unregulated negative input voltage $V_{IN3}$ is input to the negative voltage regulator 30 at an input node $N_{IN}$. The negative voltage regulator 30 is capable of regulating the negative input voltage $V_{IN3}$ and outputting a regulated negative output voltage $V_{OUT3}$ at an output node $N_{OUT}$. 330 is a reference voltage generator, such as a band gap circuit, included in the present semiconductor device 300. The reference voltage generator 330 is capable of generating reference voltages utilized in the circuits included in the device 300. Reference voltages $V_{ref31}$ and $V_{ref32}$ are two examples of the reference voltages generated by the reference voltage generator 330.

The voltage regulator 310 is utilized to regulate a voltage source $V_{DD}$. The voltage regulator 310 includes a PMOS transistor p3 and an operational amplifier 363. The source of the PMOS transistor p3 is electrically connected to the high level voltage source of the circuit, that is, $V_{DD}$, and the drain of the PMOS transistor p3 is electrically connected to a node $N_S$. As shown in FIG. 3, the two input ends of the operational amplifier 363 are separately electrically connected to the drain of the PMOS transistor p3 and a reference voltage $V_{ref31}$ provided by the reference voltage generator 330, and the output end of the operational amplifier 363 is electrically connected to the gate of the PMOS transistor p3. The voltage regulator 310 is capable of providing a stable voltage source $V_S$ independent of the unstable voltage source $V_{DD}$ at the node $N_S$ by fixing the voltage potential of the drain of the PMOS transistor p3 to the potential of the reference voltage $V_{ref31}$. The current source circuit 320 includes two triple-well NMOS transistors n1 and n2. The current on the NMOS transistor n1 is proportional to the current on the NMOS transistor n2. The sources of the NMOS transistors n1 and n2 are electrically connected to the input node $N_{IN}$. Since the NMOS transistors n1 and n2 are triple-well NMOS transistors, the voltage potentials at their drains and sources can be negative. The negative input voltage $V_{IN3}$ is input to the negative voltage regulator 30 at the sources of the NMOS transistor n1 and n2. The voltage potential divider 340 is utilized to divide the negative output voltage $V_{OUT3}$ and feedback the division to the present voltage regulator 30. There are many embodiments of the voltage potential divider. The voltage potential divider 340 illustrated in FIG. 3 is the simplest one. As shown in FIG. 3, the voltage potential divider 340 includes two dividing resistors R31 and R32. The two ends of the voltage potential divider 340 are electrically connected to the output node $N_{OUT}$ of the negative voltage regulator 30 and the node $N_S$ for dividing the voltage $V_S$ and the negative output voltage $V_{OUT3}$ and feeding back the division to the present voltage regulator 30. The driver 350 includes two PMOS transistors p1 and p2. The sources of the transistors p1 and p2 are electrically connected to the node $N_S$ receiving the stable voltage source $V_S$. The gates of the transistors p1 and p2 are electrically connected to the output ends of the operational amplifiers 361 and 362 respectively, therefore the output voltages of the operational amplifiers 361 and 362 control the current $I_1$ that flows through the transistor p1 and the current $I_2$ that flows through the transistor p2 respectively. Each of the two operational amplifiers 361 and 362 receives the reference voltage $V_{ref32}$ generated by the reference voltage generator 330 at one input end, and electrically connects to the node $N_{FEBK3}$ by the other input end receiving the feedback voltage $V_{FEBK3}$.

As illustrated in FIG. 3 and the described above, the operation of the present negative voltage regulator 30 can be presented as follows. First, assume that the voltage regulator 310 and the voltage potential divider 340 are well designed and the values of the reference voltages $V_{ref31}$ and $V_{ref32}$ are well chosen for coordination. When the negative output voltage $V_{OUT3}$ is higher than a target potential, the feedback voltage $V_{FEBK3}$ increases and exceeds the reference voltage $V_{ref32}$ accordingly. Thereby the output voltage of the operational amplifier 361 is at high level and the output voltage of the operational amplifier 362 is at low level, which leads to a decreasing of the current $I_1$ and an increasing of the current $I_2$. However, the currents on the transistor n1 and n2 are proportional. If the current $I_1$ decreases and the current $I_2$ increases, there must be some current flowing from the node $N_{OUT}$ to the transistor n1 to complement the current $I_1$. This current will pull down the feedback voltage $V_{FEBK3}$ and the negative output voltage $V_{OUT3}$, that is, adjust the negative output voltage $V_{OUT3}$ to the target potential level. On the contrary, if the negative output voltage $V_{OUT3}$ is lower than the target potential, the feedback voltage $V_{FEBK3}$ decreases and becomes lower than the reference voltage $V_{ref32}$ accordingly. Thereby the output voltage of the operational amplifier 361 is at low level and the output voltage of the operational amplifier 362 is at high level, which leads to an increasing of the current $I_1$ and a decreasing of the current $I_2$. Similarly, if the current $I_1$ increases and the current $I_2$ decreases, there must be some part of current $I_1$ flowing from the node $N_{OUT}$ to the voltage potential divider 340. This current will pull up the feedback voltage $V_{FEBK3}$ and the negative output voltage $V_{OUT3}$, that is, adjust the negative output voltage $V_{OUT3}$ to the target potential level.

The present invention feeds back the division of the negative output voltage $V_{OUT3}$ to the negative voltage regulator 30 for controlling the currents $I_1$ and $I_2$ through the transistors p1 and p2 included in the driver 350, and adjusts the potential of the negative output voltage $V_{OUT3}$ to a target potential level by the variation of the currents $I_1$ and $I_2$. One of the characteristics of the present invention is the utilization of the two triple-well NMOS transistors. As it is known, it is better to bias the source and the base of a transistor at the same voltage potential. The triple-well NMOS transistors utilized in the present invention enables the sources and the drains of the transistors n1 and n2 to be connected to negative voltages. Therefore the sources of the transistors n1 and n2 can be the input node of the present invention negative voltage regulator, and the drain of the transistor n1 can be the output node of the present invention negative voltage regulator. Consequently the negative voltage regulation is implemented.

The circuit illustrated in FIG. 3 is one of the embodiments of the present semiconductor device with a negative voltage regulator. In implementation, the divider 340 may connect to the output node $N_{OUT}$ and a reference voltage $V_{ref33}$ other than $V_S$, and the elements comprised in the divider 340 and the structure of the divider 340 may be different with suitable design. The voltage regulator 310 may be omitted or be replaced by another band gap circuit. The structure of the driver 350 shown in FIG. 3 is the simplest example. Other circuits with different structures but the same function may replace the driver 350 in the present invention.

In summary, the present invention takes advantage of the property of the triple-well NMOS transistors and provides a precise and effective negative voltage regulator. The output regulated negative voltage of the present invention is stable and thereby improves the performance of the circuits that need to utilize negative voltage. It has been shown by experiment that, if the negative input voltage is −7 V with noise of 200 mV, the negative output voltage regulated by the present negative voltage regulator will be −7 V with noise of less than 50 mV. In contrast to the conventional negative voltage regulator, the claimed negative voltage regulator provides negative voltage regulation with high performance and supports the operation of flash memory cards.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A semiconductor device with a negative voltage regulator comprising:
    a negative voltage regulator capable of regulating a negative input voltage and outputting a negative output voltage at a first output node, the negative voltage regulator comprising:
        a driver for adjusting the negative output voltage, the driver comprising a first transistor and a second transistor, a first node and a second output node, wherein the first node is electrically connected with a first voltage source and the second output node is electrically connected with the first output node of the negative voltage regulator;
        a first operational amplifier comprising a first input end, a second input end and an output end electrically connected with a feedback voltage, a first reference voltage and the first transistor respectively, the first operational amplifier capable of outputting a driving voltage for controlling a current of the first transistor according to the feedback voltage and the first reference voltage;
        a second operational amplifier comprising a first input end, a second input end and an output end electrically connected with a second reference voltage, the feedback voltage and the second transistor respectively, the second operational amplifier capable of outputting a driving voltage for controlling a current of the second transistor according to the second reference voltage and the feedback voltage;
        a current source circuit capable of providing the driver a current, the current source circuit comprising two triple-well n-type metal-oxide semiconductor (NMOS) transistors, wherein drains of the two triple-well NMOS transistors are electrically connected with a drain of the first transistor and a drain of the second transistor separately and sources of the two triple-well NMOS transistors are electrically connected with the negative input voltage; and
        a voltage potential divider comprising a first end, a second end and a feedback node, wherein the first end and the second end are electrically connected with a second voltage source and the first output node respectively, and the feedback node is electrically connected with the first input end of the first operational amplifier and the second input end of the second operational amplifier, the voltage potential divider capable of generating the feedback voltage by dividing the potentials of the second voltage source and the negative output voltage and outputting the feedback voltage to the first operational amplifier and the second operational amplifier for adjusting the current of the first transistor and the current of the second transistor and thereby regulating the negative output voltage.

2. The semiconductor device of claim 1 wherein each of the first transistor and the second transistor is a p-type metal-oxide semiconductor (PMOS) transistor.

3. The semiconductor device of claim 1 wherein each of the first transistor and the second transistor is a PMOS transistor, wherein a source of the first transistor and a source of the second transistor are electrically connected with the first voltage source, a gate of the first transistor is electrically connected with the output end of the first operational amplifier and a gate of the second transistor is electrically connected with the output end of the second operational amplifier.

4. The semiconductor device of claim 3 wherein the second output node of the driver is the drain of the first transistor.

5. The semiconductor device of claim 3 wherein the second output node of the driver is the drain of the second transistor.

6. The semiconductor device of claim 1 wherein for each of the two triple-well NMOS transistors a base is electrically connected with a source; the drain and a gate of one triple-well NMOS transistor are electrically connected with each other, and the drain of the other triple-well NMOS transistor is electrically connected with the second output node of the driver.

7. The semiconductor device of claim 1 further comprising an oscillator and a negative pump, wherein an output end of the oscillator is electrically connected with an input end of the negative pump, and an output end of the negative pump is electrically connected with the sources of the two triple-well NMOS transistors.

8. The semiconductor device of claim 1 further comprising a reference voltage generator capable of generating the first reference voltage and the second reference voltage.

9. The semiconductor device of claim 1 wherein the driver and the voltage potential divider are electrically connected to the same voltage source.

10. The semiconductor device of claim 1 further comprising:
    a voltage regulator capable of generating the first voltage source with which the first node of the driver is electrically connected, the voltage regulator comprising:
        a PMOS transistor wherein a source of the PMOS transistor is electrically connected with a third voltage source, and a drain of the PMOS transistor is electrically connected with the first node of the driver; and
        a third operational amplifier comprising a first input end, a second input end and an output end electrically connected with the drain of the PMOS transistor, a third reference voltage and a gate of the PMOS transistor respectively, the third operational amplifier capable of fixing a voltage potential of the drain of the PMOS transistor to a voltage potential of the third reference voltage.

11. The semiconductor device of claim 10 further comprising a reference voltage generator capable of generating the first reference voltage, the second reference voltage and the third reference voltage.

12. The semiconductor device of claim 1 being a flash memory.

* * * * *